3,429,876
REDUCTION METHOD OF CARBONYL GROUP
Wataru Nagata, Nishinomiya-shi, and Hiroshi Itazaki, Takarazuka-shi, Japan, assignors to Shionogi & Co., Ltd., Osaka, Japan
No Drawing. Filed Feb. 12, 1965, Ser. No. 432,373
Claims priority, application Japan, Feb. 14, 1964, 39/7,924
U.S. Cl. 260—239.55                          1 Claim
Int. Cl. C07c *173/00, 169/26;* C07b *1/00*

The present invention relates to an improvement of the so-called Wolff-Kishner's reduction method, which comprises heating a carbonyl compound or its masked derivative at 100–150° C. (the temperatures described throughout the specification are all measured inside the reaction vessels) for several hours in a polar solvent having high boiling point in the presence of a strong acid and excess amount of hydrazine or its hydrate, adding an alkali hydroxide, heating the mixture to raise the reaction temperature up to above 180° C. and, finally, maintaining at the same temperature for several hours.

The object of this invention is to embody much more effective reduction of carbonyl or masked carbonyl group inclusive of highly hindered ones using cheaper reagents and simpler and safer operation.

The Wolff-Kishner's reduction, which comprises converting a carbonyl group into the corresponding hydrazone, semicarbazone or azine group and decomposing the group with alkali to form corresponding methylene or methyl group, is a famous name reaction which has been widely used in general organic chemistry owing to many advantages such as selectivity, high yield, wide application field, basicity of medium, etc. But it has several disadvantages such as complexity and troublesomeness of the procedure.

The throublesomeness in the procedure, especially the use of sealed tube, which also is a likely origin of explosion, was eliminated by Whitmore et al. (J. Am. Chem. Soc., 67, 2061 (1945)) by using a high boiling polar solvent such as triethylene glycol in an open vessel.

The complexity in the procedure, especially the use of two-step technique, hydrazone formation and alkali decomposition, was improved by Huang-Minlon (J. Am. Chem. Soc., 68, 2487 (1946)) to one-step procedure wherein both steps are carried out simultaneously by one basic catalyser and, thereby, other troubles in the procedure were also improved, for example, basic catalyser was exchanged from alkali alkoxide to cheaper alkali hydroxide and anhydrous hydrazine was replaced by cheaper and safer hydrazine hydrate.

Thus established modification of Wolff-Kishner's reduction method, which has been called Huang-Minlon's modification, has been widely used recently in place of the original Wolff-Kishner's method.

However, since the highly hindered or masked carbonyl structures have appeared along with the progress of organic chemistry a more effective reduction method capable of reducing such a resistant group has been needed, because the Huang-Minlon's modification could not reduce such resistant carbonyl groups in satisfactory yield. For example, 3α-hydroxy-5α,25D-spirostan - 11 - one afforded only about 30–40% yield of the corresponding 11-deoxo compound.

On the other hand, Barton et al. (J. Chem. Soc., 1955, 2056) improved the Huang-Minlon's modification to adapt it for reducing highly hindered carbonyl group. Barton's modification, however, requires quite expensive compensations for accomplishing the object. Namely, it requires the use of very explosive absolutely anhydrous hydrazine in place of hydrazine hydrate, expensive and dangerous metallic sodium in place of cheaper alkali hydroxide, troublesome complex operation to maintain absolute anhydrous state of the apparatus throughout the procedure and long reaction period inclusive of more than 10 hours hydrazone formation and more than 24 hours alkali decomposition. Moreover, it is accompanied with the other disadvantage of decomposing a protective group such as acetal, ketal, ether, etc. owing to highly vigorous reaction condition required. Furthermore, by the inventor's examinations, much more highly hindered carbonyl groups such as 11-oxo group in 8β-methyl steroids, 7-oxo group in 4,10b-propano-6a,8-ethanoperhydro benz[h]isoquinoline derivatives, etc. or masked carbonyl groups could not be reduced in satisfactory yield.

According to the present invention, however, carbonyl or masked carbonyl group having high steric hindrance can be reduced to the corresponding methylene or methyl group in quite satisfactory yield by the use of strong acid in the hydrazone formation step as designated above. Thus, the present invention accomplished for the first time more effective reduction of highly hindered carbonyl or masked carbonyl group by simple modification of Huang-Minlon's or Whitmore's modification method while preserving their advantageous merits such as convenience, safety, cheapness, etc., contrary to Barton's modification. Moreover, according to the present invention, masked carbonyl group especially imino or N-alkylimino group can be reduced equally to free carbonyl group for the first time.

The carbonyl group to which the present method is applied is aldehyde or ketone group, the method being very effective with the highly hindered groups. As the masked carbonyl groups, so-called functional derivatives of aldehyde or ketone such as iminomethylene group with or without N-substituent, for example, oxime, hydrazone, semicarbazone, thiosemicarbazone or their N'- or O-substituted derivatives, and imino group with or without N-substituent, are used.

Other groupings or structures which do not influence the subject reaction may exist in the substrate compound. Acid sensitive grouping such as acetal, ketal, enol ether, etc. is preserved throughout the process owing to the basicity of medium due to excess amount of hydrazine in the hydrazone formation step and alkali hydroxide in the alkali decomposition step. Base sensitive grouping such as ester or an ether type group is decomposed by hydrolysis during the alkali decomposition period, however, which can be easily recovered by following esterification or etherification, if required.

The solvent used in the present method must satisfy the special requirements such as sufficiently high boiling point, sufficient inertness and sufficient solubilizability to the alkal hydroxide, hydrazine, carbonyl compound and the hydrazone during the reaction period at the high temperature. According to the above special requirements, a solvent miscible freely with water and having a boiling point higher than 190° C., more preferably than 200° C., and being liquid at room temperature selected from glycols or their monoalkyl ethers with 3 to 10 carbon atoms, of the formula:

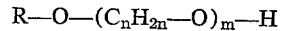
$$R—O—(C_nH_{2n}—O)_m—H$$

wherein R is H or $C_mH_{2m+1}—$ grouping, $m$ is a number within 1 to 5 and $n$ is a number within 2 to 8, or mixtures thereof, can be used. For example, trimethylene glycol, butane-1,3- or 1,4-diol, pentane-1,5-diol, hexane-2,5-diol, 2-methylpentane-2,4-diol, heptane-2,4-diol, diethylene glycol or its methyl, ethyl or butyl ether, triethylene glycol, tetraethylene glycol, dipropylene glycol or its methyl or ethyl ether or mixtures thereof can be used. Among them, an oligomer of lower alkylene glycol such as diethylene glycol, triethylene glycol, tetraethylene glycol or dipropylene glycol is more suitably used.

The strong acid to be used for catalyser in the hydrazone formation step is selected from a strong inorganic or organic acid, preferably an acid having a pKa value less than 1 such as hydrohalogenic acid e.g. hydrochloric acid, hydrobromic acid, etc., sulfuric acid or its monoester e.g. methyl sulfate or a sulfonic acid e.g. methanesulfonic acid, benzenesulfonic acid, toluenesulfonic acid, etc. By the addition of the acid which produces hardly soluble salt with hydrazine into the reaction mixture, it is required to increase the amount or to replace the type of solvent. The acid may be preferably added to the mixture as a salt with hydrazine.

As the hydrazine used in the process, hydrazine hydrate, especially commercially available 80% hydrazine hydrate (hereafter abbreviated as 80% hydrazine hydrate) can be generally used. When the reaction involves highly hindered or masked carbonyl group, more concentrated hydrazine preferably more than 95% anhydrous hydrazine, more particularly 98.5% anhydrous hydrazine (hereafter abbreviated to 98.5% anhydrous hydrazine) prepared by azeotropic distillation with toluene may be preferably used. Explosive absolute anhydrous hydrazine required in Barton's modification is not required in the present method.

Hydrazone formation step can be carried out at a lower temperature than 100° C., however, a temperature within a range of 100–150° C., more preferably within 120–130° C. is more convenient in order to accomplish the reaction within several hours, generally 1 to 10 hours. In this step, the lower the reaction temperature required the longer the period is in general.

As the alkali hydroxide, a commercial alkali hydroxide reagent having little water content is preferable, however, a commercially available pellet or stick type reagent having about 85% content of the alkali hydroxide such as potassium hydroxide or sodium hydroxide can be generally used.

Alkali decomposition step is carried out by heating to raise the reaction temperature gradually up to above 180° C., more preferably above 200° C., whereby excess amount of lower boiling component such as water and hydrazine are distilled off, and further heating to maintain the reaction mixture at the same temperature. When highly hindered or masked carbonyl compound is used, the reaction may be preferably carried out at a higher temperature such as 220–230° C. The reaction is generally accomplished within 1 to several hours, generally up to 5 hours, however, in many cases it is accomplished within about 2–3 hours.

The reaction mixture may be treated in usual manner. For example, the product is, when crystallized out in the chilled reaction mixture or aqueous mixture thereof, collected by filtration or, when it does not crystallize out, collected by extraction. The product thus collected may be purified by usual methods such as recrystallization, chromatography, etc.

The most convenient general procedure designated by us is shown as:

Standard Procedure A

Heat a mixture consisting of 1 mole of a carbonyl compound, 70 moles of 80% hydrazine hydrate, 16 moles of hydrogen chloride (or 8 moles of hydrazine dihydrochloride instead) and an appropriate amount of diethylene glycol or triethylene glycol at 120–130° C. for 2.5 hours (hydrazone formation). Add 22 moles of 85% potassium hydroxide pellets (hereafter abbreviated to potassium hydroxide pellets) thereto. Heat the mixture to raise the reaction temperature gradually up to 210° C. within about 1 hour under distilling off the lower boiling components. Finally, maintain the reaction temperature for 2.5 hours (alkali decomposition).

This standard procedure is effective for a substance having highly hindered aldehyde or ketone group such as 11-oxosteroid or that having masked carbonyl group such as imino group.

The more resistant substrate may be reduced by the next procedure:

Standard Procedure B

Treat in the same manner as designated in the above Standard Procedure A except for substitution of 98.5% anhydrous hydrazine for 80% hydrazine hydrate.

The most resistant substrate may require a stronger procedure, which can be characterized by minor modification such as increased amount of the acid catalyser, hydrazine or alkali hydroxide, prolonged reaction period, rise of reaction temperature, etc. An example is shown as:

Standard Procedure C

Heat a mixture consisting of 1 mole of a carbonyl compound, 400 moles of 98.5% anhydrous hydrazine, 64 moles of hydrogen chloride (or 32 moles of hydrazine dihydrochloride instead) and an appropriate amount of triethylene glycol at 130° C. for 7 hours (hydrazone formation). Add 70 moles of potassium hydroxide pellets thereto. Heat the mixture to raise the reaction temperature gradually up to 220° C. within about 1 hour under distilling off the lower boiling components. Finally, maintain the reaction temperature for 3 hours (alkali decomposition).

The standard procedure C consists of, compared with Barton's modification, much simpler operations with much shorter reaction periods and affords quite superior result in the reduction of highly hindered $8\beta$-methyl-11-oxo steroid.

The operations in the present method can be varied within the scope described as above. Typical examples are shown as follows:

EXAMPLE 1

A mixture consisting of 100 mg. (0.23 milli-moles) of $3\alpha$-hydroxy-$5\alpha$,25D-spirostan-11-one, 1.0 ml. (16.5 milli-moles) of 80% hydrazine hydrate, 210 mg. (2 milli-moles) of hydrazine dihydrochloride and 5 ml. of triethylene glycol is heated at 130° C. for 2.5 hours, added with 500 mg. of potassium hydroxide pellets or the equivalent amount of sodium hydroxide pellets, heated to raise the reaction temperature gradually up to 210° C. within 45 minutes and, finally, maintained at the same temperature for 2.5 hours, following the Standard Procedure A. After chilling, the reaction mixture is added with water and extracted with dichloromethane. The extract solution is washed with water, dried over anhydrous sodium sulfate and evaporated to give 100 mg. of crude product, which affords 90 mg. (yield 91%) of $5\alpha$,25D-spirostan-$3\alpha$-ol, M.P. 243–246° C. by recrystallization from dichloromethane-methanol.

EXAMPLE 2

Following the Standard Procedure A with nearly the same treatment as in the above Example 1, 100 mg. of $3\beta$-acetyloxy-$5\alpha$,25D-spirostan-11-one (11 - oxotigogenin acetate) affords 80 mg. (yield 91%) of tigogenin, M.P. 212–214° C.

EXAMPLE 3

A mixture consisting of 500 mg. of $8\beta$-methyladrenosterone 3,17-bisethylene ketal, 16 ml. of 98.5% anhydrous hydrazine, 4.2 g. of hydrazine dihydrochloride and 25 ml. of triethylene glycol is heated at 130° C. for 7 hours under protection from moisture by fitting calcium chloride tube, added with 5.75 g. of potassium hydroxide pellets, heated to raise the reaction temperature gradually up to 220° C. within 1 hour and, finally, maintained at the same temperature for 3 hours, following the Standard Procedure C. The reaction mixture is treated thereafter in a manner similar to the above Example 1, whereby 500 mg. of crude crystals are obtained. Recrystallization of the product from methanol gives 160 mg. of $8\beta$-methyl-4-androstene-3,17-dione 3,17-bisethylene ketal, M.P. 126–127° C., and chromatography of the mother liquor on alumina gives 90 mg. of the same crystalline product, total product 250 mg.; yield 52%.

Barton's modification gives 36% yield.

EXAMPLE 4

A mixture consisting of 4.22 g. of 11β-hydroxy-8β-methyl-iminomethyl-4-androstene-3,17 - dione 3,17 - bisethylene ketal, 42 ml. of 80% hydrazine hydrate, 8.85 g. of hydrazine dihydrochloride and 210 ml. of triethylene glycol is heated at 110–120° C. for 2.5 hours, added with 21.0 g. of potassium hydroxide pellets or the equivalent amount of sticks, heated to raise the reaction temperature gradually up to 210–220° C. within 50 minutes and, finally, maintained at the same temperature for 2.5 hours, following the Standard Procedure A. By the similar treatment as in the above Example 1, the reaction mixture affords 4.10 g. of crude crystals, which are dissolved in dichloromethane, washed with 10% tartaric acid solution and water, dried and evaporated to give 3.86 g. of crude crystals. Recrystallization of the crystals from dichloromethane-methanol affords 3.07 g. of 8β-methyl-11β-hydroxy-4-androstene-3,17-dione 3,17-bisethylene ketal, M.P. 201–203° C.; yield 76%.

Huang-Minlon's modification gives 13% yield.

EXAMPLE 5

Following the Standard Procedure A, 100 mg. of 5α-iminomethyl-17β-hydroxy-5α-estran-3-one ethylene ketal affords 73 mg. (yield 76%) of 5α-methyl-17β-hydroxy-5α-estran-3-one ethylene ketal; needles of M.P. 155–156° C. from methanol.

EXAMPLE 6

A mixture consisting of 500 mg. of 1,1,4a-trimethyl-7 - methoxy - 1,2,3,4,4a,9,10,10a - octahydro(4a/10a-trans)phenanthren-2-one semicarbazone, 4 ml. of 80% hydrazine hydrate, 1.6 g. of hydrazine dihydrochloride and 8 ml. of triethylene glycol is heated at 120° C. for 3 hours, added with 3.4 g. of potassium hydroxide pellets after chilling, heated to raise the reaction temperature gradually up to 210° C. within 3 hours and, finally, maintained at the same temperature for 1.5 hours. The reaction mixture is mixed with ice-water, acidified with dilute hydrochloric acid and extracted with ether. The ether solution is washed and then evaporated to afford 410 mg. of crude crystalline product. The crude product, of which the IR spectrum shows partial hydrolysis of 7-methoxyl group affording 7-hydroxyl group, is dissolved in 10 ml. of ethanol and methylated with 1.37 ml. of dimethyl sulfate and 1 g. of potassium hydroxide according to the usual procedure, whereby 395 mg. of crude product is obtained. Recrystallization of the crude product from methanol gives 300 mg. (72% yield) of 1,1,4a-trimethyl - 7 - methoxy - 1,2,3,4,4a,9,10,10a - octahydro(4a/10a-trans)phenanthrene, M.P. 82–83° C.

Substitution of dipropylene glycol, diethylene glycol or its butyl ether, pentane-1,5-diol or their mixture for triethylene glycol affords similar result.

Reference: A mixture consisting 500 mg. of 1,1,4a-trimethyl - 7 - methoxy - 1,2,3,4,4a,9,10,10a - octahydro-(4a/10a-trans)phenanthren-2-one semicarbazone, 3.5 g. of potassium hydroxide pellets and 10 ml. of triethylene glycol is heated to raise the reaction temperature gradually to 210° C. via 130° C. and maintained at the same temperature for 1.5 hours, following the usual procedure of Huang-Minlon method. The reaction mixture gives, after treatment in same manner as above Example 6, 150 mg. (yield 37%) of the same product, M.P. 81–82° C.

EXAMPLE 7

A mixture consisting 0.3 g. of (±)-2-methanesulfonyl-4 - methyl - 4,10b - propano - 6a,8 - ethanoperhydrobenz-[h]isoquinoline-7,14-dione 14-ethylene ketal, 4 ml. of 98.5% anhydrous hydrazine, 9 ml. of triethylene glycol and 0.9 g. of hydrazine dihydrochloride is heated at 120° C. for 2 hours, added with 1.6 g. of potassium hydroxide pellets, heated to raise the reaction temperature gradually up to 215° C. within 1 hour and, finally, maintained at the same temperature for 1 hour, following the Standard Procedure B. The reaction mixture is poured into ice-water and the resulting mixture is extracted with dichloromethane. The extract is washed successively with water, 2N-hydrochloric acid and water, dried over anhydrous sodium sulfate and evaporated to afford crude product, which affords crystalline (±)-2-methanesulfonyl-4-methyl-4,10b - propano - 6a, 8 - ethanoperhydrobenz[h]isoquinolin-14-one ethylene ketal, M.P. 198.5–200° C. in yield 91%, by purification using chromatography on alumina followed by recrystallization from ether.

EXAMPLE 8

A mixture consisting of 4.1 g. of 11β-hydroxy-8β-methyl-iminomethyl-5-pregnene-3,20-dione 3,20-bisethylene ketal, 36 ml. of 80% hydrazine hydrate, 7.455 g. of hydrazine dihydrochloride and 205 ml. of triethylene glycol is heated at 110° C. for 2.5 hours, added with 12.9 g. of potassium hydroxide pellets, heated to raise the reaction temperature gradually up to 210° C. and, finally, maintained at the same temperature for 1.5 hours, following the Standard Procedure A, whereby 2.912 g. (yield 77%) of 11β-hydroxy-8β-methyl-5-pregnene-3,20-dione 3,20-bisethylene ketal, M.P. 152–153° C., is obtained.

Substitution of dihydrobromide, sulfate, bisbenzenesulfonate or bis-p-toluenesulfonate for the dihydrochloride of hydrazine affords similar result.

EXAMPLE 9

Following the Standard Procedure C, a mixture of 2.5 g. of 8β-methyl-5-pregnene-3,11,20-trione 3,20-bisethylene ketal, 75 ml. of 98.5% anhydrous hydrazine, 19.5 g. of hydrazine dihydrochloride and 125 ml. of triethylene glycol is heated at 130° C for 7 hours, added with 26.7 g. of potassium hydroxide pellets, heated to raise the reaction temperature up to 220° C. and, finally, heated at the same temperature for 2.5 hours, whereby 940 mg. (yield 40%) of 8β-methyl-5-pregnene-3,20-dione 3,20-bisethylene ketal, M.P. 162–164° C., is obtained.

EXAMPLE 10

Following the Standard Procedure C with slight modification, a mixture consisting of 1 g. of 3β-acetyloxy-8β-cyano-11-oxo-20,20-ethylenedioxy-5α-pregnan-11-one, 50 ml. of triethylene glycol, 28.8 g. of 98.5% anhydrous hydrazine and 7.6 g. of hydrazine dihydrochloride is heated at 120–130° C. for 2 hours, added with 10.4 g. of potassium hydroxide pellets, heated to raise the temperature up to 210° C. within about 30–40 minutes and maintained at the same temperature for 2.5 hours, whereby 694 mg. (yield 79%) of 8β-cyano-3β-hydroxy-5α-pregnan-20-one 20-ethylene ketal, M.P. 218–220° C., is obtained.

Substitution of diethylene glycol, dipropylene glycol or tetraethylene glycol for triethylene glycol affords the same result.

EXAMPLE 11

Following the Standard Procedure A, a mixture consisting of 400 mg. of 8β-iminomethyl-3β-hydroxy-5α-androstan-17-one 17-ethylene ketal, 20 ml. of triethylene glycol, 1.8 g. of 80% hydrazine hydrate and 720 mg. of hydrazine dihydrochloride is heated at 125–130° C. for 2.5 hours, added with 2.1 g. of potassium hydroxide pellets, heated to raise the temperature up to 210° C. and, finally, maintained at the same temperature for 2.5 hours, whereby 185 mg. of 8β-methyl-3β-hydroxy-5α-androstan-17-one 17-ethylene ketal, M.P. 177–179° C., is obtained in 45% yield.

EXAMPLE 12

Following the Standard Procedure C with some modification, a mixture consisting of 4.2 g. of 8β-cyano-3β-acetyloxy-17-ethylenedioxy-5α-androstan-11-one, 225 ml. of triethylene glycol, 131.4 g. of 98.5% anhydrous hydrazine and 33.2 g. of hydrazine dihydrochloride is heated at 130° C. for 1.5 hours, added 42 g. of potassium hydroxide pellets, heated to raise the temperature up to 220° C. and, finally, maintained at the same temperature for 2 hours, whereby 2.924 g. (yield 78%) of 8β-cyano-3β-hydroxy-5α-androstan-17-one ethylene ketal, M.P. 201–201.5° C., is obtained.

EXAMPLE 13

Following the Standard Procedure C, a mixture consisting of 500 mg. of 8β-methyl-3β-acetyloxy-20,20-ethylenedioxy-5α-pregnan-11-one, 15.5 ml. of 98.5% anhydrous hydrazine, 25 ml. of triethylene glycol and 4.0 g. of hydrazine dihydrochloride is heated at 120–125° C. for 7.5 hours and then, after addition of 10 g. of potassium hydroxide pellets, at 220° C. for 2.5 hours, whereby 159 mg. (yield 37%) of 8β-methyl-20,20-ethylenedioxy-5α-pregnan-3β-ol, M.P. 179–181° C., is obtained.

EXAMPLE 14

Following the Standard Procedure C with slight modification, a mixture consisting of 80 mg. of 8β-cyano-3,3;17,17-bisethylenedioxy-5α-androstan-11-one, 2.6 ml. of 98.5% anhydrous hydrazine, 672 mg. of hydrazine dihydrochloride and 4 ml. of triethylene glycol is heated at 125–130° C. for 3 hours and then, after addition of 930 mg. of potassium hydroxide pellets, at 215–220° C. for 2.5 hours, whereby 51 mg. (yield 66%) of the corresponding 11-deoxo compound, M.P. 184–186° C., is obtained.

What we claim is:
1. A method for the reduction of a compound containing a member selected from the group consisting of =O, =N—H, =N—alkyl=N—NH$_2$, =N—CONH$_2$ and =N—CSNH$_2$ connected to a nuclear carbon atom, which comprises heating said compound at 100–150° C. in a member selected from the group consisting of glycols, glycol ethers and mixtures thereof, each of said glycols and glycol ethers being freely miscible with water, having a boiling point above 190° C., being liquid at room temperature, containing 3 to 10 carbon atoms, and corresponding to the formula

$$R—O(C_nH_{2n}—O)_m—H$$

wherein R is a member selected from the group consisting of H and $C_mH_{2m+1}$, $m$ being a number from 1 to 5 inclusive and $n$ being a number from 2 to 8 inclusive, said heating being effected at a temperature of 100–160° C. for 1 to 10 hours in the presence in the reaction medium of a strong acid having a pKa value less than 1 and of excess hydrazine, then adding alkali hydroxide and heating the resultant mixture to a temperature above 180° C. for 1 to 5 hours.

No references cited.

ELBERT L. ROBERTS, *Primary Examiner.*